(12) United States Patent
Pankau

(10) Patent No.: US 6,796,569 B2
(45) Date of Patent: Sep. 28, 2004

(54) SUSPENSION KIT

(75) Inventor: Matthew Pankau, 13 Grandview Grove, Seaforth, NSW (AU), 2092

(73) Assignees: Matthew Pankau (AU); Angela Clarke (AU); Matthew Barnett (AU); Suzzanne Barnett (AU)

( * ) Notice: Subject to any disclaimer, the term of this patent is extended or adjusted under 35 U.S.C. 154(b) by 9 days.

(21) Appl. No.: 10/102,383

(22) Filed: Mar. 19, 2002

(65) Prior Publication Data

US 2003/0111815 A1 Jun. 19, 2003

(30) Foreign Application Priority Data

Dec. 14, 2001 (AU) .......................................... 2001100645

(51) Int. Cl.⁷ .............................................. B60G 15/07
(52) U.S. Cl. ..................... 280/124.155; 280/124.147; 267/221
(58) Field of Search .................. 280/124.155, 124.147, 280/124.154, 124.145, 124.146; 267/221

(56) References Cited

U.S. PATENT DOCUMENTS

| | | | | |
|---|---|---|---|---|
| 3,037,787 A | * | 6/1962 | Gottschald | 280/124.147 |
| 4,213,631 A | * | 7/1980 | Wilkerson | 280/86.752 |
| 4,324,416 A | * | 4/1982 | Schneeweiss et al. | 280/86.757 |
| 4,332,397 A | * | 6/1982 | Steger | 280/124.155 |
| 5,484,161 A | * | 1/1996 | McIntyre | 280/124.155 |
| 6,328,321 B1 | * | 12/2001 | Nolan | 280/124.155 |
| 6,485,223 B1 | * | 11/2002 | Van Schmus et al. | 280/124.155 |

* cited by examiner

Primary Examiner—Peter C. English
(74) Attorney, Agent, or Firm—Ostrolenk, Faber, Gerb & Soffen, LLP

(57) ABSTRACT

The invention provides a kit to enable a vehicle with an unequal arm type suspension to be replaced with a McPherson strut type suspension without modification to the vehicle chassis. A mounting assembly attaches to the upper suspension mounting points of the vehicle and the upper end of the McPherson strut attaches to the mounting assembly.

1 Claim, 9 Drawing Sheets

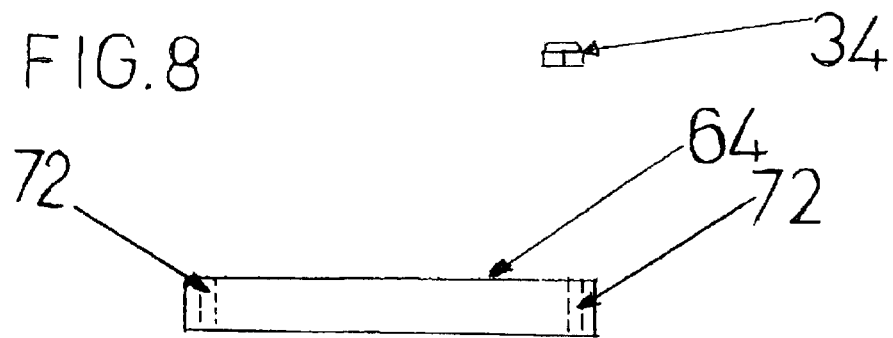
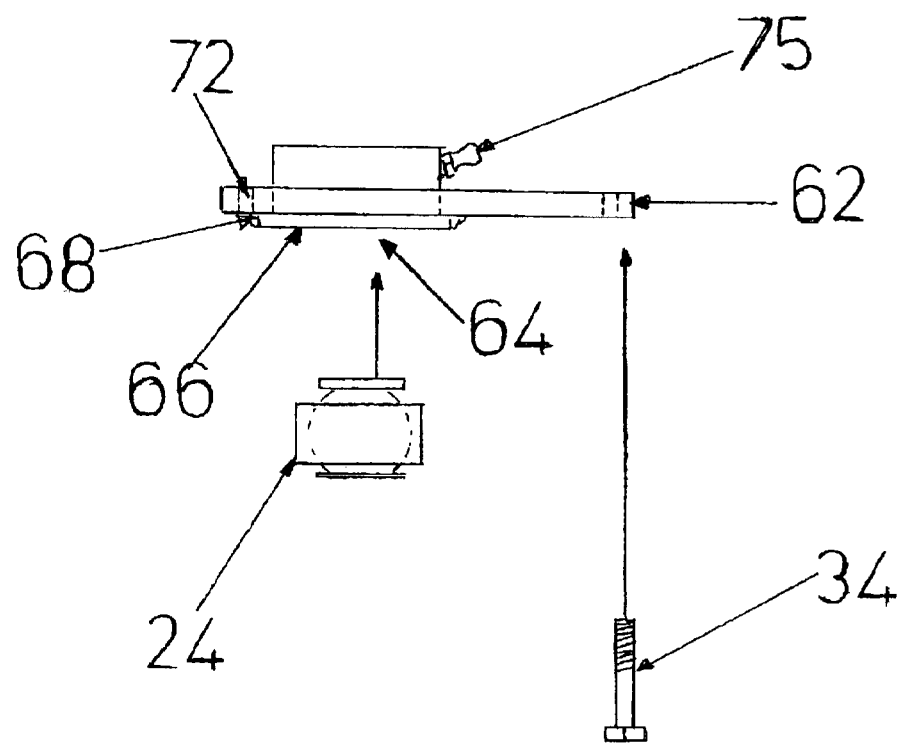
FIG.8

SUSPENSION KIT

TECHNICAL FIELD

This invention relates to replacement suspensions and more particularly to suspension kits that replace the original suspension on old cars with a modem suspension design. The invention is mainly applicable to replacement front suspension kits.

BACKGROUND ART

Cars produced today are designed for radial tyres, which are effectively the only type of tyre commercially available. Radial tyres first started to be mass produced in the mid 1960's and before that time almost all tyres were of a cross ply design. The characteristics of radial and cross ply tyres are quite different. In particular the sidewall rigidity of cross ply tyres is significantly different to that of radial tyres. The configuration of the suspension of cars originally designed to run on cross ply tyres is significantly different to that of suspension designed for radial tyres. There are many old cars designed for cross ply tyres still running on the roads, with the result that the suspension and steering characteristics of the car are mismatched to the radial tyres upon which they run.

DISCLOSURE OF THE INVENTION

In one embodiment the invention provides a bolt-on modern McPherson strut type suspension for replacement of old suspension systems so that the suspension is better suited to modern radial tyres.

In one broad form the invention provides a suspension kit for installation of a McPherson strut type suspension in a vehicle, the kit including an upper mounting assembly for mounting to the vehicle's chassis and for receiving the upper end of a McPherson strut, whereby the upper end of a McPherson strut is secured in a desired location.

Preferably the upper mounting assembly includes a generally planar plate and a spacer, and in use the spacer is sandwiched between the plate and the vehicle chassis.

Preferably the spacer is sized to fit snugly in a recess in the vehicle chassis originally designed to receive the original suspension components.

The plate preferably includes a mounting for attachment to the McPherson strut.

More preferably the plate is generally circular and the mounting is offset from the centre of the plate.

BRIEF DESCRIPTION OF THE DRAWINGS

FIG. 8 is a side view of the components of the adapter plate of FIG. 7.

BEST MODE OF CARRYING OUT THE INVENTION

Figure 1:
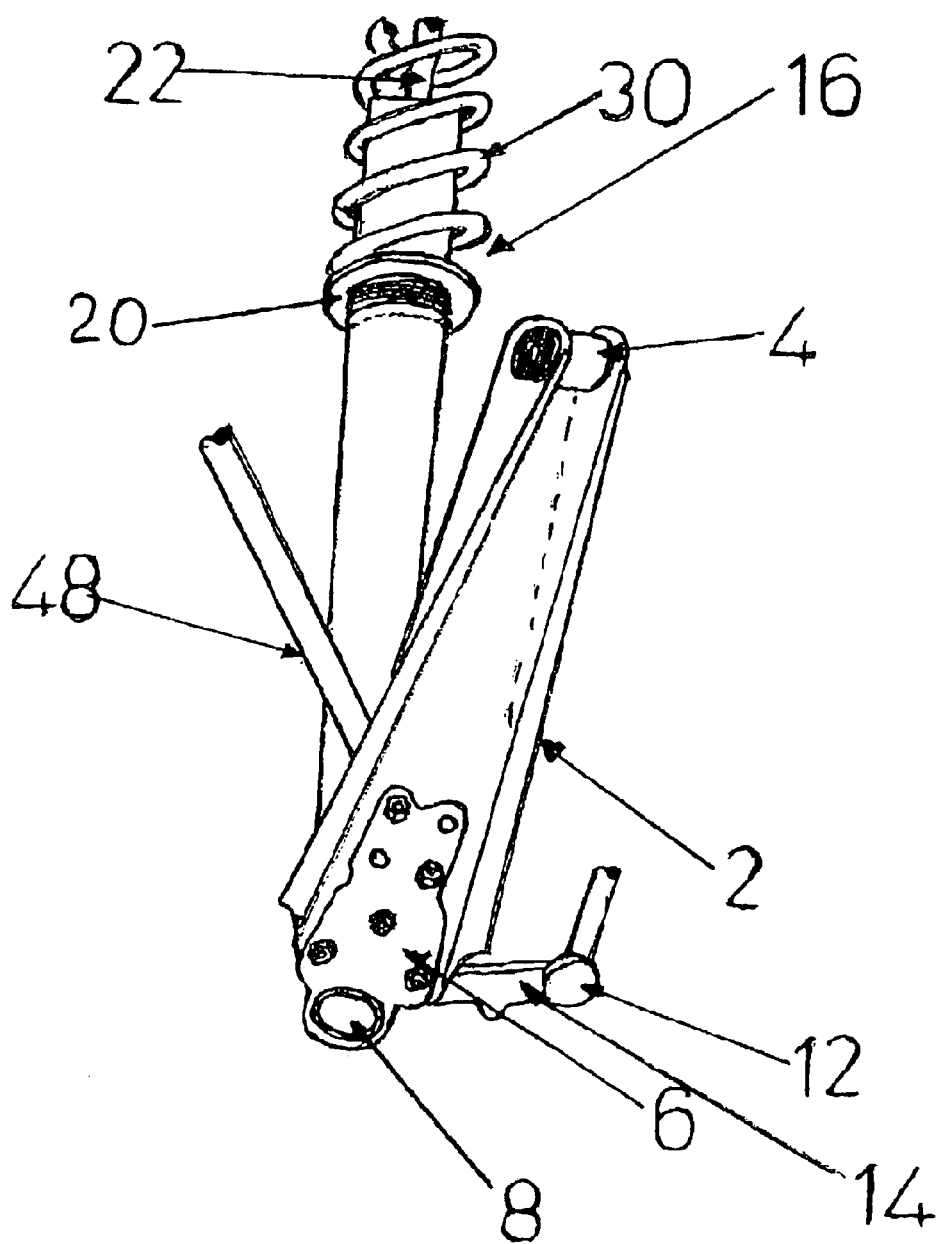
FIG. 1 is a perspective view from below of part of a suspension kit according to an embodiment of the invention.
Figure 2:
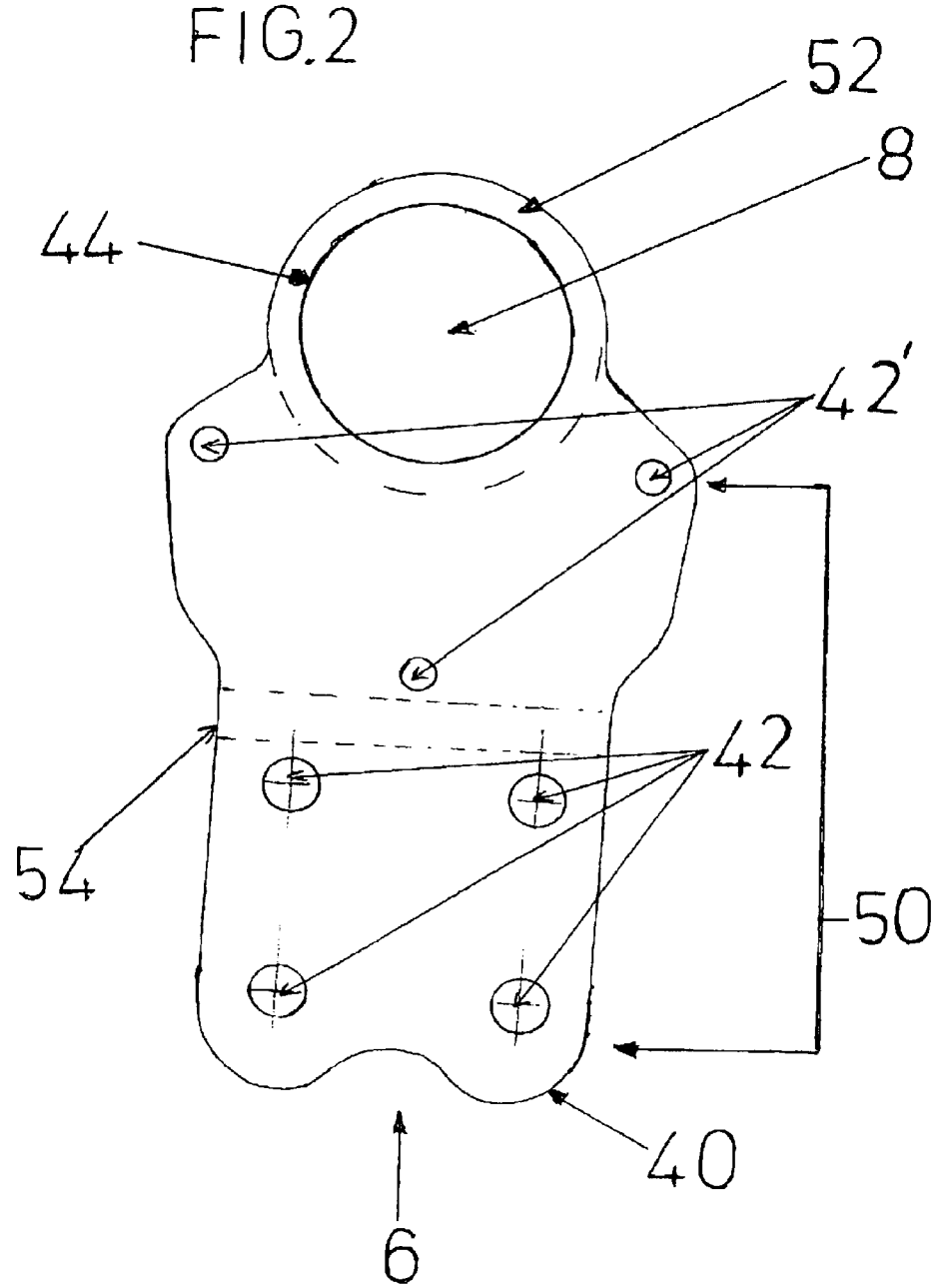
FIG. 2 is a plan view of a ball joint adapter plate according to an embodiment of the invention.
Figure 3:
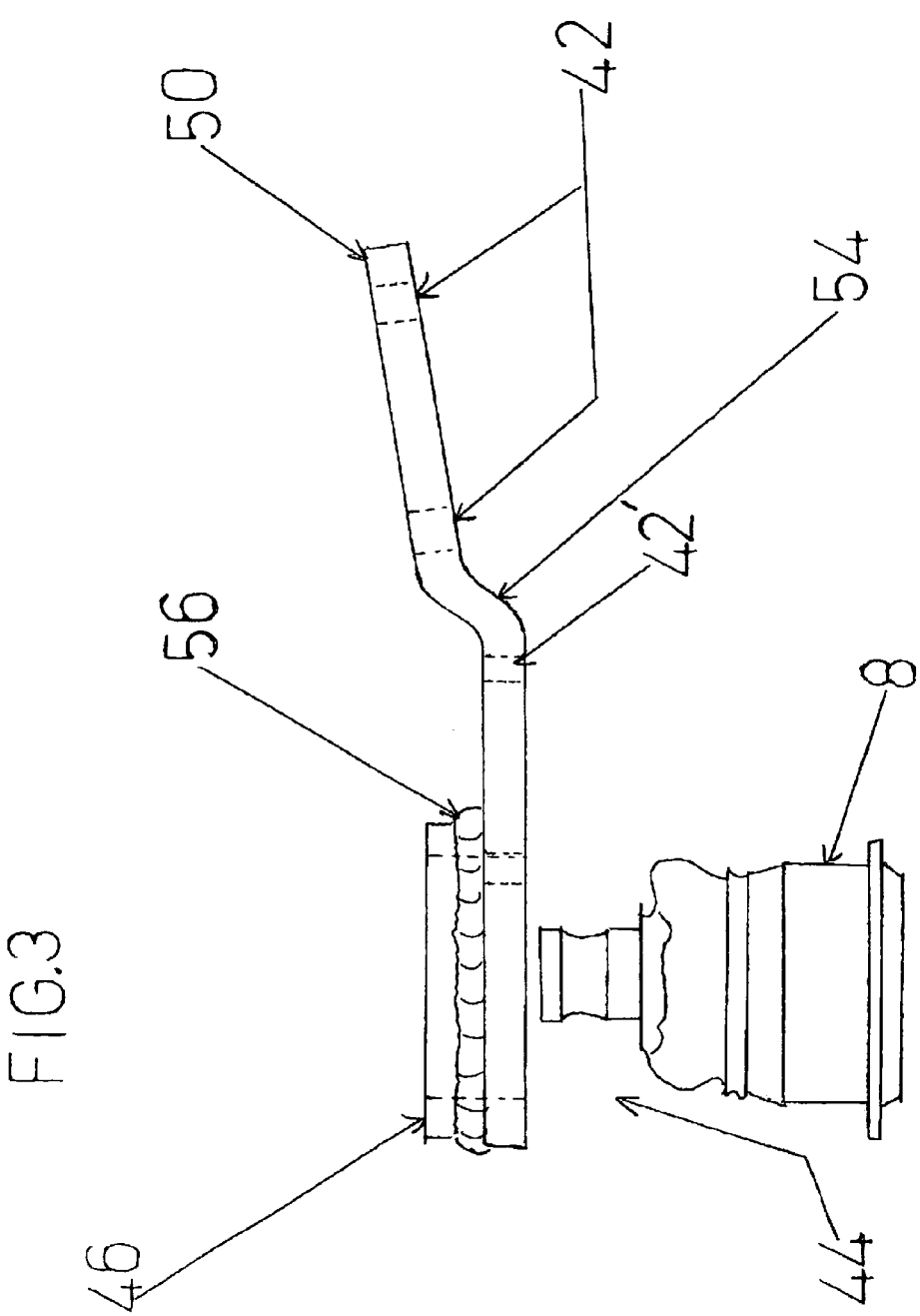
FIG. 3 is a side view of the ball joint adapter plate of FIG. 2 and a ball joint prior to assembly of the ball joint adapter plate and the ball joint.
Figure 4:
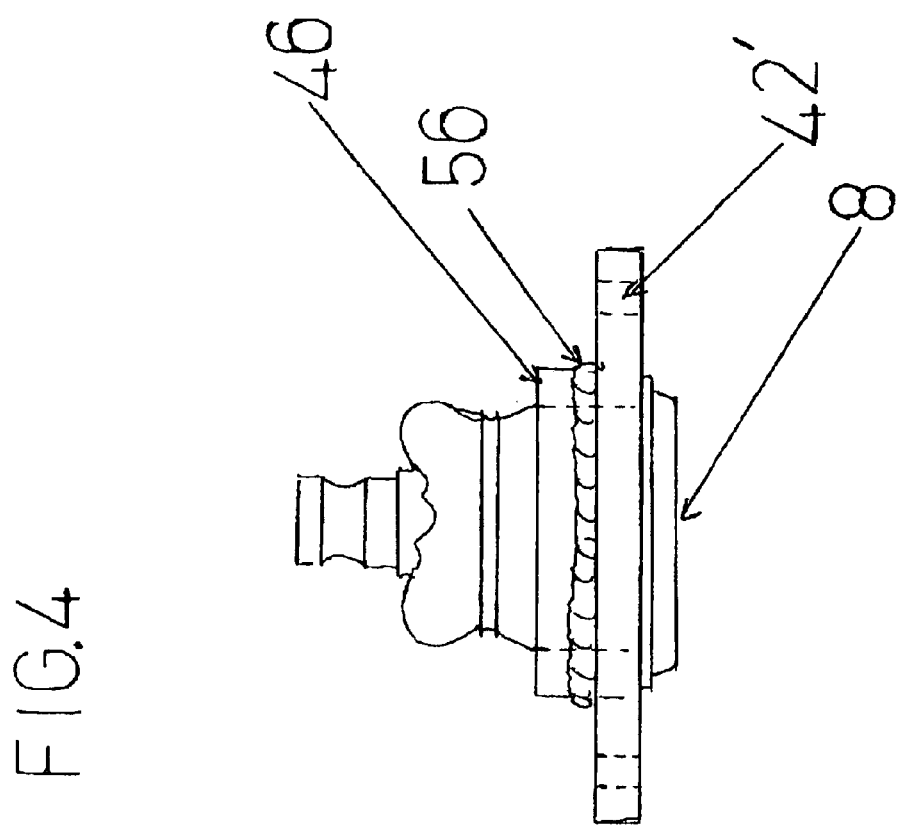
FIG. 4 is a partial side view of the assembled ball joint adapter plate and ball joint.
Figure 9:
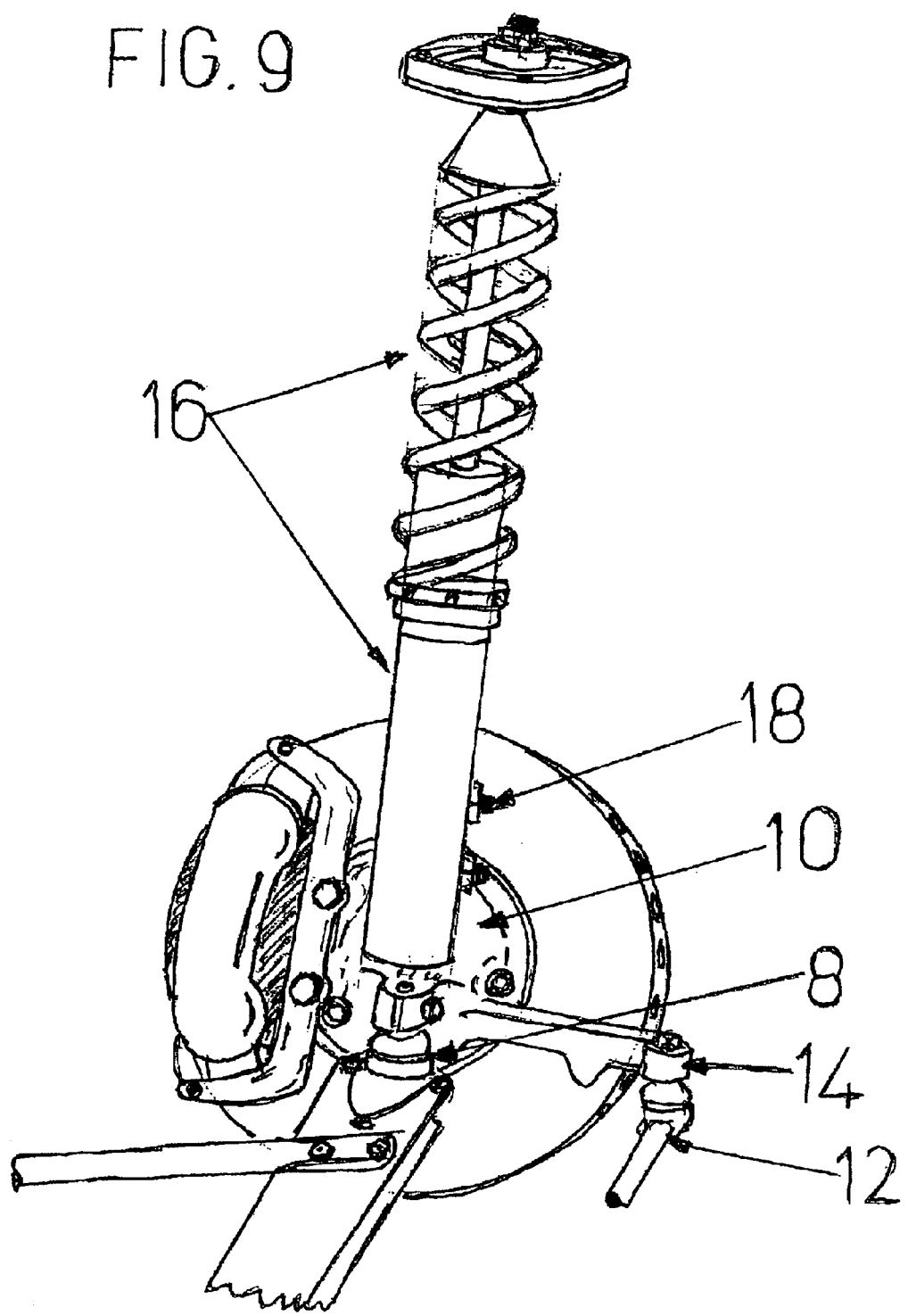
FIG. 9 is a side view of the entire suspension assembly according to the invention.

FIG. 1 shows an underside perspective view of part of the suspension kit according to one embodiment of the invention and there is shown original equipment manufactured (OEM) lower control arm 2. The lower control arm 2 is pivotally mounted on the chassis of the vehicle via bush 4 and castor rod 48. Secured to the control arm 2 is a ball joint mounting plate 6, in which is mounted a ball joint 8. A steering knuckle and axle hub assembly 10 (see FIG. 9) is mounted on the ball joint 8, such that the axle may be rotated on the ball joint by the steering control rod 12, which attaches to arm 14. Mounted on the steering knuckle and axle hub 10 is a combined damper and spring unit 16, otherwise known as a McPherson strut. The McPherson strut 16 is a conventional unit that bolts to the steering knuckle and axle hub 10 via bolts 18.

The McPherson strut 16 has screw threaded adjusting rings 20, by which the preload of the spring 30 may be adjusted, although this is not essential. The top of the damper rod 22 of McPherson strut 16 is mounted in a spherical ball joint 24 of upper mounting assembly 26. The upper mounting assembly 26 is attached to the vehicle chassis 33 at the original spring/damper seating via nuts and bolts 34.

The lower ball joint mounting plate 6 includes a steel plate 40 shaped to fit the OEM lower control arm 2. The plate has a first portion 50 for attachment to the lower control arm 2 and a second portion 52 for receiving the ball joint 8. The plate 40 is provided with a first set of bolt holes 42 for attachment to the lower control arm 2. Whilst four holes are provided, not all are needed and this is to allow a single plate to fit lower control arms of different models from the same family of vehicles. A second set of bolt holes 42' is also provided. The plate 40 is also bent, at 54, so that the ball joint is correctly angled for the new suspension set up.

The plate includes an aperture 44 and, on the top surface, around this aperture is welded a retaining ring 46 sized to receive a readily available after market replacement ball joint. The weld 56 is preferably a low oxygen, high tensile weld, but this is not essential. The ball joint 8 is an interference fit in the retaining ring 46. The ball joint 8 is a standard ball joint and is designed to attach to a standard McPherson strut mounting knuckle.

Figure 5:
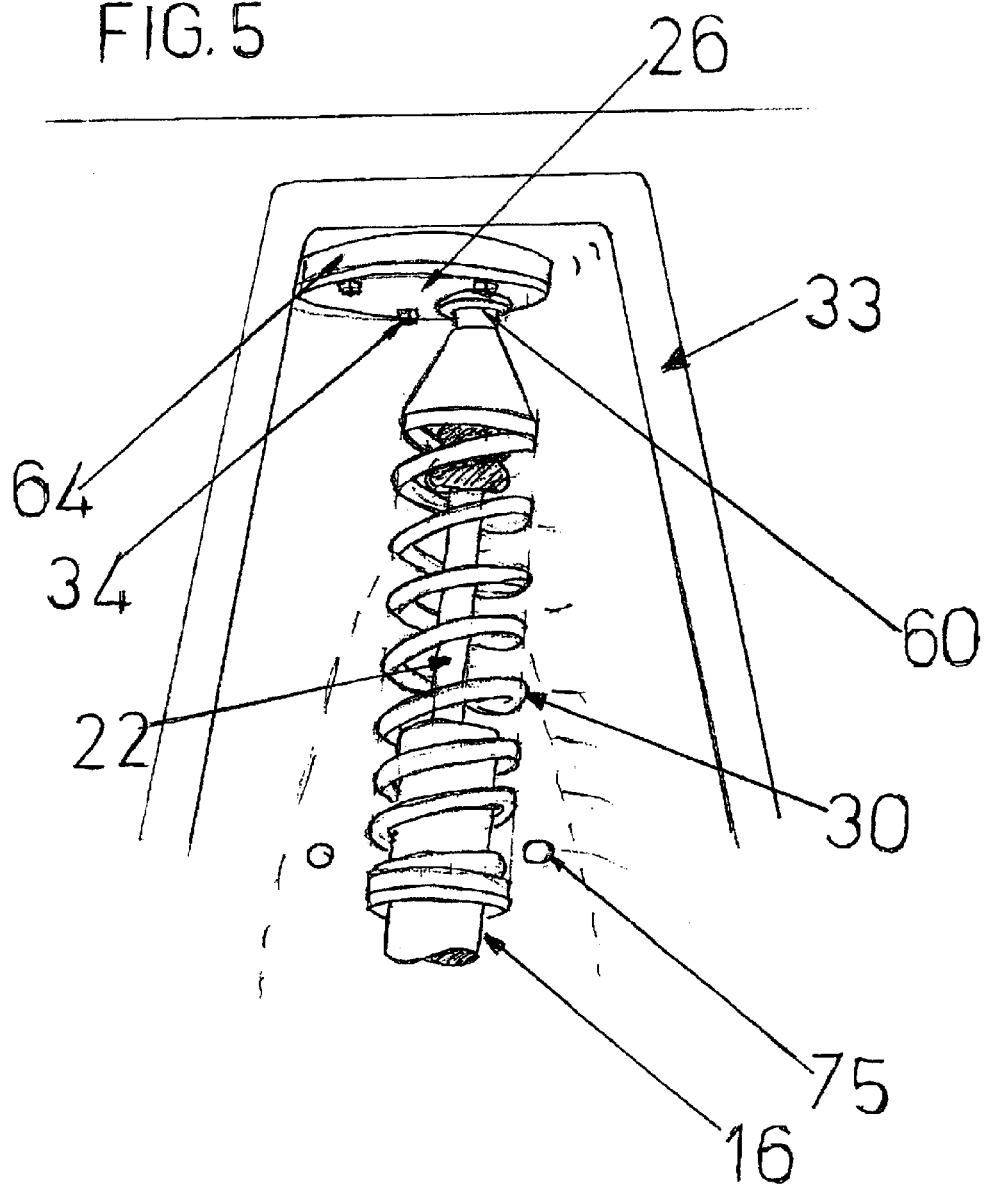
FIG. 5 is a perspective view from underneath of a vehicle wheel arch showing the upper potion of the suspension kit of FIG. 1 as installed.
Figure 6:
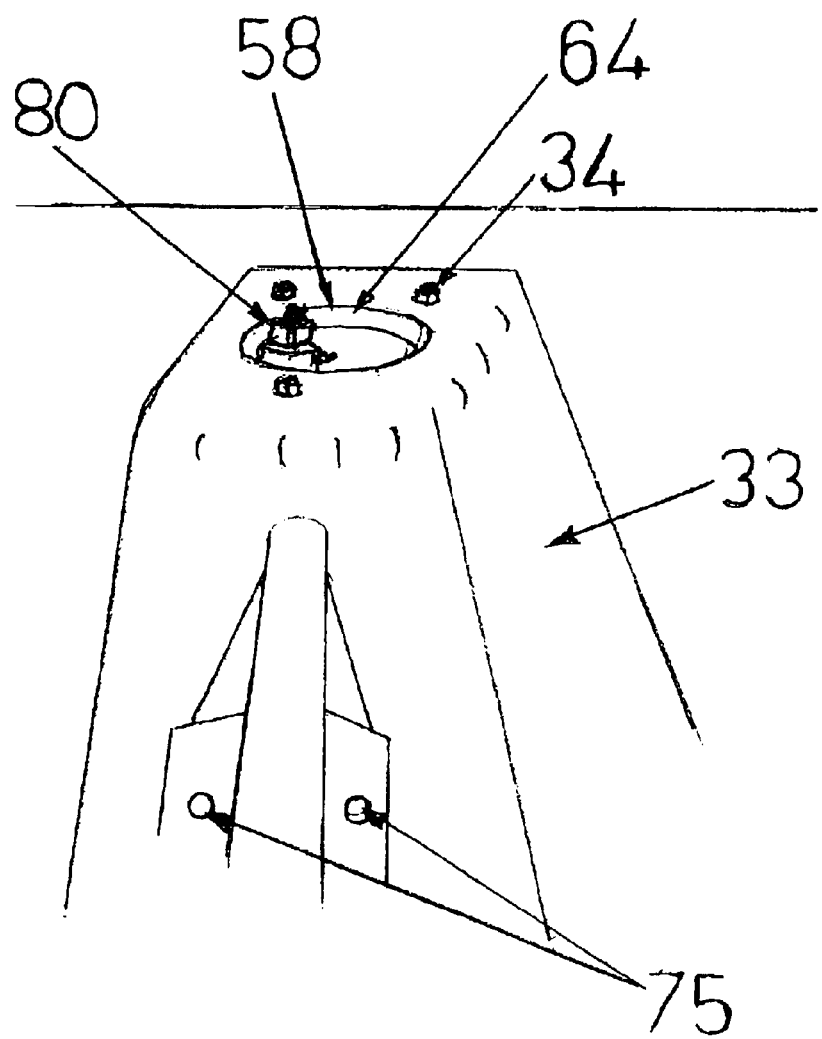
FIG. 6 is a perspective view from above of the vehicle engine bay showing part of the suspension kit as installed.
Figure 7:
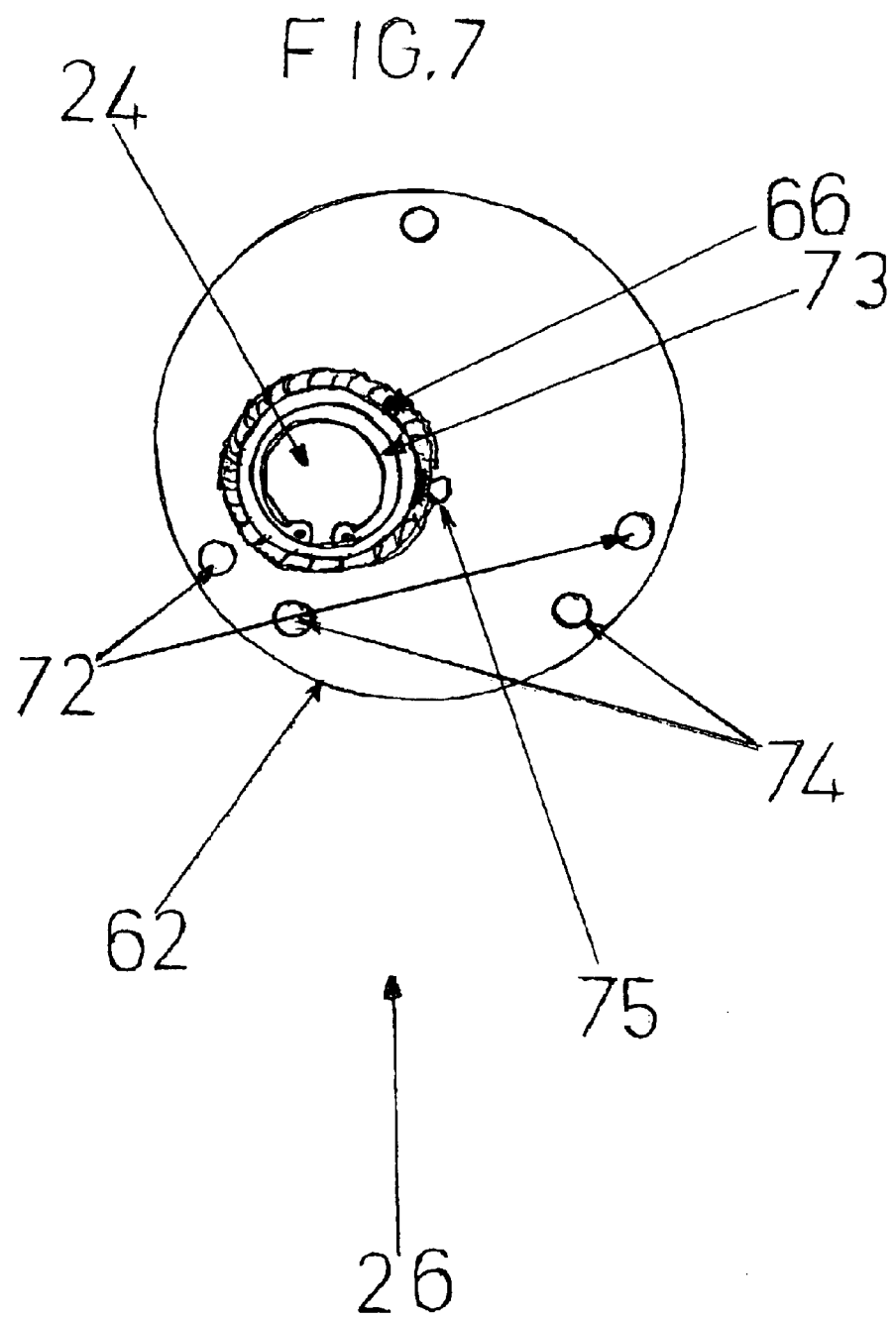
FIG. 7 is a plan view of the underside of the upper mounting adapter plate.

FIGS. 5 and 6 show the method of mounting the McPherson strut to the vehicle chassis 33. Generally, in the vehicles to which the preferred embodiment applies, the springs originally used have a much larger coil diameter than needed for modem suspensions and mounting hole 58 for the original damper unit is much larger than now needed. In addition, and as seen in FIG. 5, the top of the spring 30 is prevented from moving by retaining cone 60, which in turn is secured to the top of the damper rod 22. Thus only the damper rod needs to be secured to the vehicle chassis 33, via mounting assembly 26. The original suspension mounting points 75 are no longer used. Accordingly a mounting assembly 26 is provided that attaches to the vehicle chassis 33, via nuts and bolts 34. As best seen in FIGS. 7 and 8, the mounting plate assembly 26 includes a generally planar plate 62 and a spring seat spacer ring 64. The spring seat spacer ring 64 is sized to fit in the recess in the vehicle chassis into which the original springs fitted and so provide positive location of the assembly 26. The ring also lowers the plate 62 so the assembly does not extend into the engine bay unnecessarily. The spacer ring is a separate component but may be welded to the planar plate or formed integrally with the planar plate.

The plate 62 has an aperture 64 and a ball joint housing 66 is passed through the aperture and welded to the bottom surface of the plate 62, again preferably using a low oxygen, high tensile weld 68. The spherical ball joint 24 is push fit into the housing 66 and retained by a circlip 73. The ball joint housing 66 is preferably provided with a grease nipple 75 for regreasing of the spherical ball joint 24. The spherical ball joint is preferably a high impact load carrying sealed ball joint. The damper rod 22 is passed through the spherical ball joint and secured in the correct position by lock nut 80 and circlip 73.

Both the plate 62 and the ring 64 are provided with two sets of holes 72 and 74 for attaching the assembly to the vehicle chassis via high tensile nuts and bolts 34. Preferably the nuts are self-locking. Only one set of holes is required and the other set is provided so one mounting assembly may be used on different model vehicles. If desired only one set of holes may be provided. It will also be understood that whilst some vehicles may use a three point attachment method, others may use four or more and the number of mounting holes will be appropriate for the vehicle.

The bolts pass though the plate and ring and through the original mounting points in the vehicle chassis to secure the plate and ring in position. Thus no special tools or location techniques are required. To secure the plate and ring in position one places the plate and ring in the original recess and aligns the appropriate set of mounting holes with the mounting holes in the vehicle chassis. Once the bolts are secured, the assembly is located in the correct position.

The aperture 64 is offset from the centre of the plate 62 in the preferred embodiment and so the mounting point of the McPherson strut will be offset both laterally and longitudinally relative to the centre point. This is so that the castor and camber angles of the McPherson strut are appropriate. Depending on the model of vehicle the location of the aperture may vary.

It will be apparent to those skilled in the art that many obvious modifications and variations may be made to the embodiments described herein without departing from the spirit or scope of the invention.

The claims defining the invention are as follows:

1. A suspension kit for replacing a non-McPherson strut suspension with a McPherson strut suspension in a vehicle, the kit including an upper mounting assembly for mounting to a chassis of the vehicle and for receiving the upper end of a McPherson strut, whereby the upper end of the McPherson strut is secured in a desired location, the upper mounting assembly including:
a generally circular planar plate;
a spherical ball joint mounted on the plate for receiving the upper end of the McPherson strut, and
a generally circular spacer ring,
wherein the spherical ball joint is offset from the centre of the plate, and both the generally circular spacer ring and the generally circular planar plate have a plurality of sets of holes therethrough to allow a specific one of said sets of holes to align with holes in the chassis to connect the upper mounting assembly to a specific type of vehicle to provide castor and camber angles for the McPherson strut suspension, and
wherein in use the spacer is sandwiched between the plate and the vehicle chassis.

* * * * *